US012441301B2

(12) United States Patent
Masoud et al.

(10) Patent No.: US 12,441,301 B2
(45) Date of Patent: Oct. 14, 2025

(54) SEQUENTIAL PEDESTRIAN TRAJECTORY PREDICTION USING STEP ATTENTION FOR COLLISION AVOIDANCE

(71) Applicants: DENSO International America, Inc., Southfield, MI (US); THE REGENTS OF THE UNIVERSITY OF MICHIGAN, Ann Arbor, MI (US)

(72) Inventors: Neda Masoud, Ann Arbor, MI (US); Mahdi Bandegi, Ann Arbor, MI (US); Joseph Lull, South Haven, MI (US); Rajesh Malhan, Troy, MI (US); Ethan Zhang, Ann Arbor, MI (US)

(73) Assignees: DENSO International America, Inc, Southfield, MI (US); The Regents of The University of Michigan, Ann Arbor, MI (US)

( * ) Notice: Subject to any disclaimer, the term of this patent is extended or adjusted under 35 U.S.C. 154(b) by 372 days.

(21) Appl. No.: 17/879,966

(22) Filed: Aug. 3, 2022

(65) Prior Publication Data
US 2023/0038673 A1 Feb. 9, 2023

Related U.S. Application Data

(60) Provisional application No. 63/229,202, filed on Aug. 4, 2021.

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0956* (2013.01); *B60W 40/04* (2013.01);
(Continued)

(58) Field of Classification Search
CPC ............ B60W 30/09; B60W 30/0956; B60W 60/0015; B60W 60/0011;
(Continued)

(56) References Cited

U.S. PATENT DOCUMENTS 11,061,402 B2 * 7/2021 Urtasun ................. G06V 10/82
2018/0046901 A1 * 2/2018 Xie ......................... G06F 7/5443
(Continued)

FOREIGN PATENT DOCUMENTS

CN 110781838 A * 2/2020 ............. G06T 7/246
CN 110737968 B * 3/2021 ............. G06N 3/045
(Continued)

OTHER PUBLICATIONS

Zhang,Chunli,andXuTian."Non-UniformTrajectoryTrackingAdapti veIterativeLearningControlforNonlinearPure-Feedback SystemswithInitialStateErrorBasedonRBF-NeuralNetwork. "202140thChineseControlConference(CCC). (Year: 2021).*
(Continued)

*Primary Examiner* — Ramya P Burgess
*Assistant Examiner* — Keith A von Volkenburg
(74) *Attorney, Agent, or Firm* — Harness, Dickey & Pierce, P.L.C.

(57) ABSTRACT

A pedestrian tracking system includes: a buffer or a memory configured to store a trajectory sequence of a pedestrian; a step attention module and a control module. The step attention module iteratively performs a step attention process to predict states of the pedestrian. Each iteration of the step attention process includes the step attention module: learning the stored trajectory sequence to provide time-dependent hidden states, reshaping each of the time-dependent hidden states to provide two-dimensional tensors; condensing the two-dimensional tensors via convolutional networks to provide convolutional sequences; capturing
(Continued)

global information of the convolutional sequences to output a set of trajectory patterns represented by a new sequence of tensors; learning time-related patterns in the new sequence and decoding the new sequence to provide one or more of the states of the pedestrian; and modifying the stored trajectory sequence to include the predicted one or more of the states of the pedestrian.

32 Claims, 7 Drawing Sheets

(51) Int. Cl.
  *B60W 40/04* (2006.01)
  *B60W 50/00* (2006.01)
  *B60W 60/00* (2020.01)
  *G06N 3/04* (2023.01)

(52) U.S. Cl.
  CPC .... *B60W 50/0097* (2013.01); *B60W 60/0011* (2020.02); *B60W 60/0015* (2020.02); *B60W 60/00274* (2020.02); *G06N 3/04* (2013.01); *B60W 2050/0005* (2013.01); *B60W 2554/4029* (2020.02); *B60W 2554/4041* (2020.02)

(58) Field of Classification Search
  CPC .......... B60W 60/00274; B60W 40/04; B60W 50/0097; B60W 2554/4041; B60W 2554/4029; B60W 2050/0005; G06N 3/04
  USPC ........................................................ 701/301
  See application file for complete search history.

(56) References Cited

U.S. PATENT DOCUMENTS

| | | | | |
|---|---|---|---|---|
| 2019/0147250 A1* | 5/2019 | Zhang | .................... | G06V 20/41 382/224 |
| 2019/0147253 A1* | 5/2019 | Bai | ...................... | G01S 17/931 382/103 |
| 2019/0147254 A1* | 5/2019 | Bai | ......................... | G01S 17/86 382/104 |
| 2019/0147335 A1* | 5/2019 | Wang | .................... | G06F 18/251 706/20 |
| 2020/0117993 A1* | 4/2020 | Martinez-Canales | ......... | G06N 3/045 |
| 2020/0302187 A1* | 9/2020 | Wang | ..................... | G06V 20/52 |
| 2020/0319324 A1* | 10/2020 | Au | ........................ | H04W 48/16 |
| 2020/0405223 A1* | 12/2020 | Mai | ........................ | H04B 1/713 |
| 2020/0406860 A1* | 12/2020 | Mai | ......................... | B60R 25/31 |
| 2021/0089040 A1* | 3/2021 | Ebrahimi Afrouzi | ........ | G05D 1/0248 |
| 2021/0091866 A1* | 3/2021 | Zhang | .................. | H04B 17/309 |
| 2021/0160709 A1* | 5/2021 | Marumo | ............... | H04W 24/02 |

FOREIGN PATENT DOCUMENTS

| | | | | |
|---|---|---|---|---|
| CN | 112446436 A | * | 3/2021 | ......... G06F 18/2415 |
| CN | 112487954 A | * | 3/2021 | ............. G06N 3/044 |
| CN | 113056749 A | * | 6/2021 | ............... G06N 3/08 |

OTHER PUBLICATIONS

Davchev,Todor,MichaelBurke,andSubramanianRamamoorthy."Learningstructuredrepresentationsofspatialandinteractivedynamicsfortrajectorypredictionincrowdedscenes."IEEERoboticsandAutomationLetters6.2(2020):707-714 (Year: 2020).*

Huang,Yichen,andJoelEMoore."NeuralNetworkRepresentationofTensorNetworkandChiralStates."Physicalreviewletters 127.17(2021):1-170601.Web. (Year: 2021).*

"Step Attention: Sequential Pedestrian Trajectory Prediction," by Ethan Zhang, Student Member, IEEE, Neda Masoud, Member, IEEE, Mahdi Bandegi, Joseph Lull, and Rajesh K. Malhan; IEEE Sensors Journal (vol. 22, Issue 8, Apr. 15, 2022), Published Mar. 10, 2022.

* cited by examiner

SEQUENTIAL PEDESTRIAN TRAJECTORY PREDICTION USING STEP ATTENTION FOR COLLISION AVOIDANCE

CROSS-REFERENCE TO RELATED APPLICATIONS

This application claims the benefit of U.S. Provisional Application No. 63/229,202, filed on Aug. 4, 2021. The entire disclosure of the above application is incorporated herein by reference.

FIELD

The present disclosure relates to pedestrian tracking systems.

BACKGROUND

This section provides background information related to the present disclosure which is not necessarily prior art.

A vehicle-to-everything (V2X) system implements vehicle-to-vehicle (V2V) communication and vehicle-to-infrastructure (V2I) communication. In a V2X system, map messages can be transmitted including data indicating paths of vehicles on roadways. The map messages can be transmitted from roadside units (RSUs) and received at vehicles. A vehicle can utilize the map data for location and navigation purposes, as well as, sensor data to avoid collisions with inanimate and animate objects, such as other vehicles and pedestrians. This avoidance can be based on detected and tracked locations of the pedestrians.

SUMMARY

This section provides a general summary of the disclosure, and is not a comprehensive disclosure of its full scope or all of its features.

A pedestrian tracking system is disclosed that implements step attention. Step attention includes using a history trajectory of a pedestrian to predict a future trajectory of the pedestrian. Step attention has a deep architecture that includes a number of recurrent and convolutional kernels and an attention mechanism with a time distributed kernel. A sliding window is used and, in each time step, a oldest point in the trajectory is discarded and a remaining trajectory is appended by the most recent one or more predicted point (or states). After this update, step attention provides a updated and predicted trajectory of the pedestrian for traffic safety applications.

In other features, a pedestrian tracking system is provided and includes: a buffer or a memory configured to store a trajectory sequence of a pedestrian; a step attention module and a control module. The step attention module is configured to iteratively perform a step attention process to predict multiple states of the pedestrian and iteratively modify the stored trajectory sequence to provide a resultant trajectory sequence including the states. Each iteration of the step attention process includes the step attention module: learning the stored trajectory sequence to provide a plurality of time-dependent hidden states, reshaping each of the time-dependent hidden states to provide two-dimensional tensors; condensing the two-dimensional tensors via convolutional networks to provide convolutional sequences; capturing global information of the convolutional sequences to output a set of trajectory patterns represented by a new sequence of tensors; learning time-related patterns in the new sequence and decoding the new sequence to provide one or more of the multiple states of the pedestrian; and modifying the stored trajectory sequence to include the one or more of the multiple states. The control module is configured to, based on the resultant trajectory sequence, perform a countermeasure operation to avoid a collision with the pedestrian.

In other features, the stored trajectory sequence is a single dimensional sequence including i) locations of the pedestrian, ii) speeds of the pedestrian or iii) velocities of the pedestrian.

In other features, the stored trajectory sequence is a multi-dimensional sequence including two or more of i) locations of the pedestrian, ii) speeds of the pedestrian and iii) velocities of the pedestrian. In other features, the modifying of the stored trajectory sequence to include the one or more of the multiple states includes removal of a different one or more states previously included in the stored trajectory sequence.

In other features, entries of the stored trajectory sequence are at least one of i) previous actual states of the pedestrian, and ii) predicted states of the pedestrian. In other features, the previous actual states and the predicted states are positions, speeds or velocities of the pedestrian.

In other features, the step attention module includes long-short term memories of a first recurrent neural network kernel, the long-short term memories being configured to learn the trajectory sequence to provide the time-dependent hidden states.

In other features, the pedestrian tracking system further includes a second recurrent neural network kernel. The step attention module is configured to assign pipelines respectively to outputs of the first recurrent neural network kernel. The second recurrent neural network kernel is configured to receive outputs of the plurality of pipelines and to provide the one or more of the plurality of states.

In other features, each of the pipelines includes a reshape module, the convolutional networks, and fully connected modules connected in series.

In other features, the step attention module includes a time distributed kernel comprising: reshape modules configured to reshape the time-dependent hidden states to provide the two-dimensional tensors; and fully connected modules configured to capture the global information of the convolutional sequences to output the set of trajectory patterns represented by the new sequence of tensors.

In other features, the step attention module is configured to, during each iteration of the step attention process: condense the two-dimensional tensors of each hidden state to provide condensed data via first convolutional networks; perform maxpooling to down sample the condensed data to provide down sampled data via a maxpooling layer; and condense the down sampled data to provide the convolutional sequences via second convolutional networks. The convolution networks include the first convolutional networks and the second convolutional networks.

In other features, the step attention module is configured to perform augmented attention to capture the global information.

In other features, the step attention module includes a gated recurrent unit recurrent neural network kernel configured to learn the time-related patterns in the new sequence and decode the new sequence into the one or more of the multiple states.

In other features, the gated recurrent unit recurrent neural network kernel comprises a gated recurrent unit and fully connected modules.

In other features, the step attention module is configured to, during each iteration of the step attention process, discard an oldest location of the pedestrian stored in the buffer or the memory as part of the trajectory sequence and append the one or more of the plurality of states to the trajectory sequence.

In other features, a method of operating a pedestrian tracking system is provided, the method includes: storing a trajectory sequence of a pedestrian in a buffer or a memory; and iteratively performing a step attention process to predict multiple states of the pedestrian and iteratively modify the stored trajectory sequence to provide a resultant trajectory sequence including the states. Each iteration of the step attention process includes: learning the stored trajectory sequence to provide a plurality of time-dependent hidden states; reshaping each of the plurality of time-dependent hidden states to provide two-dimensional tensors; condensing the two-dimensional tensors via convolutional networks to provide convolutional sequences; capturing global information of the convolutional sequences to output a set of trajectory patterns represented by a new sequence of tensors; learning time-related patterns in the new sequence and decoding the new sequence to provide one or more of the multiple states of the pedestrian; and modifying the stored trajectory sequence to include the one or more of the multiple states. The method further includes, based on the resultant trajectory sequence, performing a countermeasure operation to avoid a collision with the pedestrian.

In other features, the stored trajectory sequence is a single dimensional sequence including i) locations of the pedestrian, ii) speeds of the pedestrian or iii) velocities of the pedestrian. In other features, the stored trajectory sequence is a multi-dimensional sequence including two or more of i) locations of the pedestrian, ii) speeds of the pedestrian and iii) velocities of the pedestrian.

In other features, the modifying of the stored trajectory sequence to include the one or more of the multiple states includes removal of a different one or more states previously included in the stored trajectory sequence.

In other features, entries of the stored trajectory sequence are at least one of i) previous actual states of the pedestrian, and ii) predicted states of the pedestrian.

In other features, the previous actual states and the predicted states are positions, speeds or velocities of the pedestrian. In other features, the method further includes, via the long-short term memories of a first recurrent neural network kernel, learning the trajectory sequence to provide the time-dependent hidden states.

In other features, the method further includes: assigning pipelines respectively to outputs of the first recurrent neural network kernel; and receiving at a second recurrent neural network kernel outputs of the pipelines and to provide the one or more of the states.

In other features, each of the pipelines includes a reshape module, the convolutional networks, and fully connected modules connected in series.

In other features, the method further includes: reshaping the time-dependent hidden states to provide the two-dimensional tensors; and capturing the global information of the convolutional sequences to output the set of trajectory patterns represented by the new sequence of tensors.

In other features, the method further includes, during each iteration of the step attention process: condensing the two-dimensional tensors of each hidden state to provide condensed data via first convolutional networks; performing maxpooling to down sample the condensed data to provide down sampled data via a maxpooling layer; and condensing the down sampled data to provide the convolutional sequences via second convolutional networks. The convolution networks include the first convolutional networks and the second convolutional networks.

In other features, the method further includes performing augmented attention to capture the global information.

In other features, the method further includes, via a gated recurrent unit recurrent neural network kernel, learning the time-related patterns in the new sequence and decoding the new sequence into the one or more of the multiple states.

In other features, the gated recurrent unit recurrent neural network kernel comprises a gated recurrent unit and fully connected modules.

In other features, the method further includes, during each iteration of the step attention process, discarding an oldest location of the pedestrian stored in the buffer or the memory as part of the trajectory sequence and appending the one or more of the plurality of states to the trajectory sequence.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
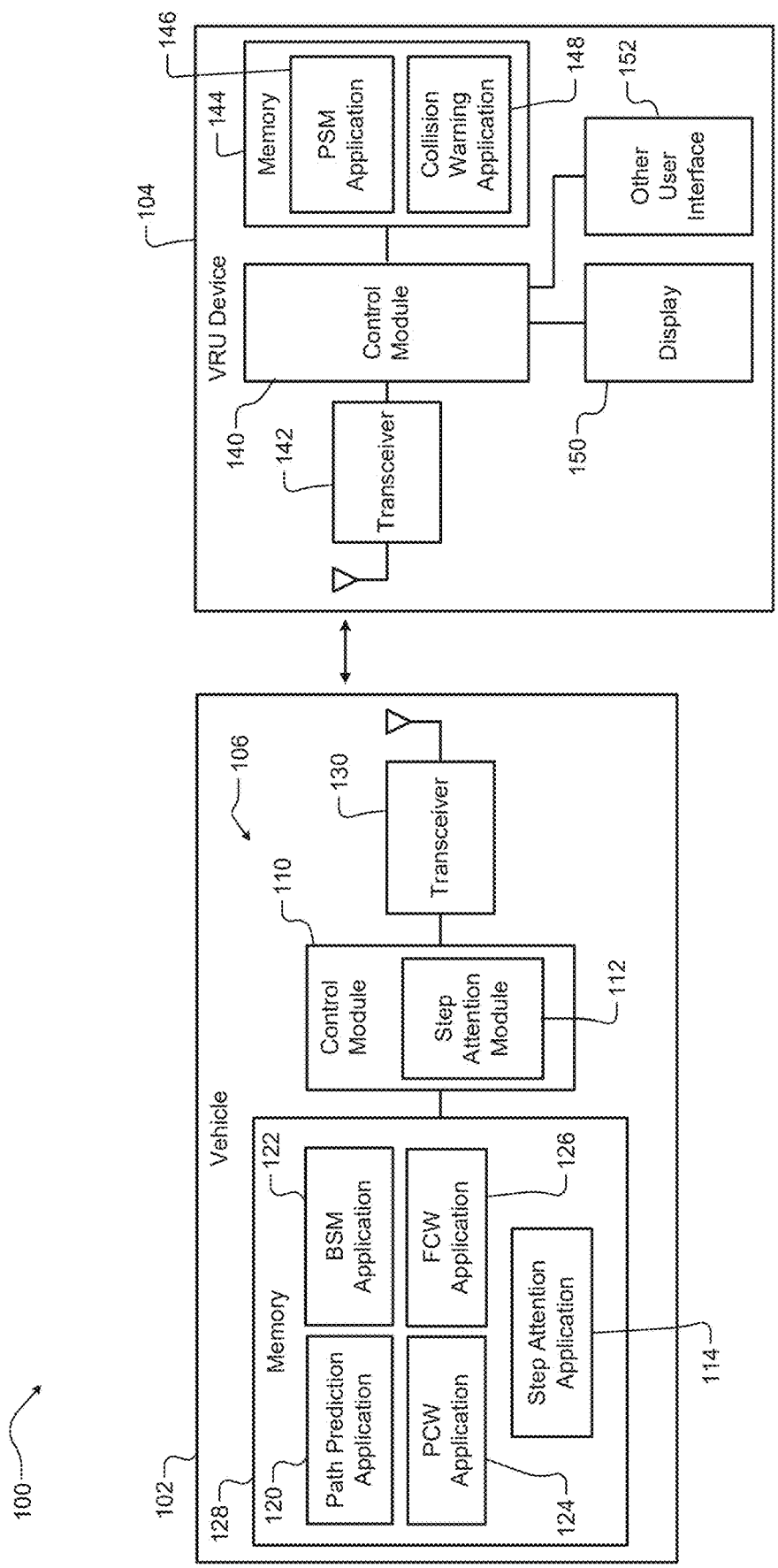
FIG. 1 is a functional block diagram of a pedestrian collision avoidance system including a pedestrian tracking system implementing a step attention application in accordance with the present disclosure.

An autonomous vehicle (AV) is equipped with sensors to capture a surrounding environment including dynamic information regarding surrounding traffic agents. AVs may share a roadway with legacy vehicles as well as other road users. Consequently, one important aspect of autonomous driving is for the autonomous entity to predict future trajectories of surrounding agents, and plan motion of the autonomous entity accordingly. In addition to alleviating safety concerns, high-quality trajectory prediction of other agents can enhance model predictive control (MPC) performance of AVs.

The examples disclosed herein provide pedestrian trajectory systems that predict trajectories of pedestrians (or most vulnerable road users). Due to the advancements in sensor technologies, real-time pedestrian location information indicating current pedestrian locations can be easily obtained. Pedestrians' movements can be perceived by cameras, localization units, and/or other devices in real time. Given a perceived trajectory of a pedestrian, high-quality predictions of future pedestrian movements can be generated. Accurate pedestrian trajectory prediction is important for preventing a collision between AVs and pedestrians.

Precise pedestrian trajectory prediction is required for long look-ahead planning. Such predictions allow AVs to plan paths that satisfy safety requirements and safely engage in other related driving tasks. This can ensure the safety of AV occupants, pedestrians, and other surrounding road users. However, the complex nature of walking behavior of pedestrians makes long lookahead walking trajectory prediction a challenging problem. In general, pedestrians move slower than vehicles, but their motion change can be rapid due to the complex nature of human behavior. For an adult, the length of a single step ranges from 0.71 meters (m) when walking to 1.49 m when running, taking approximately 0.33 seconds(s) to 0.53 s to take a step. Additionally, a pedestrian's walking behavior can be subjective, depending on: an individual's characteristics (e.g., age, gender, etc.); the individual's goal for walking; and the individual's dynamically changing surrounding environment (e.g., public environment, road surface, etc.).

Example embodiments will now be described more fully with reference to the accompanying drawings.

The examples set forth herein include a pedestrian tracking system, which may be implemented as part of a pedestrian collision avoidance and/or warning system. The pedestrian tracking systems implement a deep learning model, which is referred to herein as a step attention model that is used for prediction of pedestrian trajectories. The pedestrian tracking system may perform countermeasures and generate alert messages based on tracked and predicted locations of pedestrians to prevent collisions with pedestrians.

The step attention model has a unique architecture that includes recurrent neural networks, convolutional neural networks, and an augmented attention mechanism. Rather than developing architectures to model factors that may affect pedestrian walking behavior, the step attention model learns pedestrian trajectory patterns based directly on input trajectory sequences. Use of the step attention model provides reduced average displacement error and reduced final displacement error as compared to traditional approaches that use a social LSTM, a social generative adversarial network (GAN), or an occupancy LSTM. The step attention model also produces accurate prediction results for different scenarios including pedestrians having different walking patterns (e.g., straight and curvy) and moving in different environments (e.g., sidewalk and street). The average displacement errors are within the length of a single step of an adult.

Examples disclosed herein include use of the step attention model for long look-ahead horizon pedestrian trajectory prediction. Instead of utilizing as much information as possible, e.g., surrounding traffic status information, road surface condition information, weather condition information, etc., the step attention model uses history trajectories of subject pedestrians. This reduces information requirements as compared to other learning based methods. By using a reduced amount of information and the information being history trajectories, the step attention model is more adaptive to different systems. This is because history trajectories are one of the most universally used and basic types of information, which can be easily accessed in different environments.

The step attention model has a novel architecture that includes an LSTM-recurrent neural network (RNN) kernel, a time-distributed kernel, and a gated recurrent unit (GRU)-RNN kernel, which are used to learn different patterns. In the time-distributed kernel, augmented attention is introduced as an improvement strategy to mitigate drawbacks of convolutional neural networks (CNNs) and to learn global information from previous layers of the step attention model. The step attention model uses a sequential prediction strategy, which allows a user to select a prediction horizon freely based on the user's need and/or tolerance to prediction error.

In an embodiment, the step attention model may include a LSTM-based and GRU-based RNN to capture sequence-related hidden features in pedestrian trajectories. A time-distributed kernel is included having multiple deep CNN layers and an augmented attention layer in order to learn patterns of walking behavior.

Unlike existing deep learning approaches, step attention does not explicitly model environmental factors such as social interactions, pedestrian density in an under-study region, road surface conditions, weather, etc. Not only is it unrealistic to collect real-time information on all these factors, but also incorporating this information creates large-scale input spaces on which learning generalizable models is impractical. This is unlike, step attention which captures environmental factors through predicting and learning patterns of pedestrian trajectories. As a result, step attention may be implemented in any generic environment, and does not require a certain density of other agents or network conditions to perform well.

Various trajectory prediction methods currently exist including physics-based models, planning-based models, and pattern-based models. The majority of existing approaches require information from all pedestrians in a scene, and use this information to inform specific modules to capture pedestrian interactions and complete a prediction process. This can limit the generalization ability of the predicting system if the surrounding environment is not a crowded scene, or not all pedestrian information is accessible due to reasons such as data privacy and lack of corresponding data collection facilities (e.g., surveillance cameras). By constructing a model specifically for capturing patterns such as social interaction, these models have to find a trade-off between improving prediction accuracy in specific scenes and maintaining generalization ability, as there can be a large number of factors affecting an individual's walking behavior. In contrast, the step attention method disclosed herein uses minimal information and adopts a decentralized approach, which includes use of only a trajectory profile of a pedestrian for whom prediction is taking place. All other factors affecting the pedestrian's movement are treated as unknown factors affecting the walking trajectory, or uncertainty of the environment, and are assumed to be learned by the model. This does not limit the applicability of the proposed step attention model to specific scenes, such as crowded spaces, but rather provides high quality predictions in a more general environment and thus is applicable for real-world pedestrian safety applications.

Deep learning based methods are able to capture interactions and relationships between features, even when the features are not close to each other in sequences, which is a restriction of CNNs. Deep learning based methods enable learning of patterns from data sequences in many fields such as video question answering, video captioning, speech recognition, and neural machine translation. A main drawback of many deep learning-based methods on learning patterns from data sequences is that deep learning-based methods are not capable of remembering and learning information in long sequences. The step attention method disclosed herein solves this problem.

Sequence prediction tasks require sequence inputs. To conduct sequence prediction, traditional deep learning models usually use encoder-decoder pairs to encode input sequences into patterns, and then directly decode the resulting learned patterns to output sequences. The step attention method disclosed herein includes, when predicting a sequence having a sequence input, creating shortcuts between a context vector built in encoder networks instead of directly connecting encoding networks with decoding networks. The creation of shortcuts compresses global information by connecting the input sequence, (e.g., the entire source input) to the target sequence (e.g., an RNN sequence). This helps improve capturing of global sequence patterns. Traditional deep-learning methods use input and target sequences separately to capture relationships between the input and target sequences. A self-attention model is a type of deep-learning model that does not use separate input and target sequences. Instead of computing representations of a target sequence, given an input vector, the self-attention model computes a representation of itself. Unlike traditional deep-learning methods which are parameterized in a deterministic way, self-attention layers of a self-attention model are always trainable, which further provides robustness. The step attention model disclosed herein includes an attention kernel that is a type of self-attention model.

FIG. 1 shows a pedestrian collision avoidance system 100 including a vehicle 102 and a vulnerable road user (VRU) device 104. The vehicle 102 includes a pedestrian tracking system 106 having a control module 110 with a step attention module 112 implementing a step attention application 114. The step attention application 114 predicts positions of pedestrians within the next n time steps, where n is an integer greater than or equal to 1.

The control module 110 may implement other applications such as a path prediction application 120, a basic safety message (BSM) application 122, a pedestrian collision warning (PCW) application 124, and a forward collision warning (FCW) application 126. The stated applications may be stored in a memory 128. The path prediction application 120 is implemented to predict a path of the vehicle 102, paths of other nearby vehicles and/or paths of objects (e.g., VRUs). The BSM application 122 is implemented to generate and broadcast BSM messages indicating, for example, speeds, headings and locations of the vehicle 102. The applications 124, 126 are implemented to perform collision warning operations to prevent collisions between the vehicle 102 and objects, such as pedestrians, VRUs (e.g., a VRU of the VRU device 104), vehicles and/or other objects. The vehicle 102 may include a transceiver 130 that is in communication with the VRU device 104.

The VRU device 104 may be a mobile device, such as a mobile phone, a tablet, a wearable device (e.g., a smart watch), etc. and carried or worn by a pedestrian. The VRU device 104 may include a control module 140, a transceiver 142 and a memory 144, which stores a personal safety message (PSM) application 146 and a collision warning application 148. The PSM application 146 is implemented to generate and broadcast PSM messages indicating, for example, speeds, headings and locations of the VRU device 104 and/or corresponding VRU. The collision warning application 148 may perform collision warning operations to prevent collisions between a VRU of the VRU device 104 and objects, such as vehicles, pedestrians, VRUs and/or other objects.

The VRU device 104 may further include a display 150 and/or other user interface 152, which are connected to the control module 140. The VRU may interact with the VRU device 104 via the display 150 and/or other user interface 152.

The applications 114, 120, 122, 124, 126, 146, 148 may be executed by the control modules 110, 140.

Figure 2:
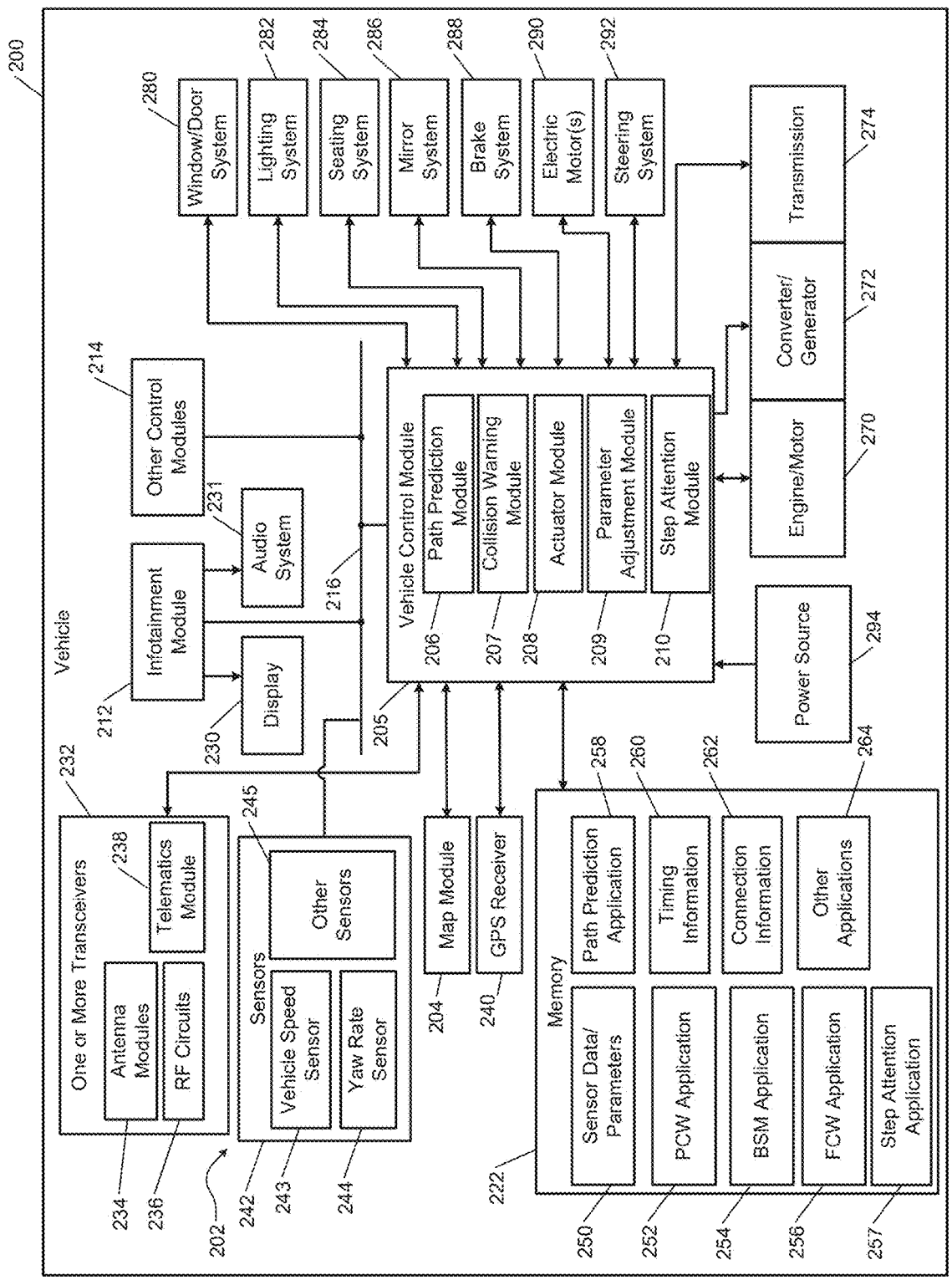
FIG. 2 is a functional block diagram of an example vehicle including the pedestrian tracking system that implements the step attention application in accordance with the present disclosure.

FIG. 2 shows a vehicle 200 that may replace one the vehicle 102 of FIG. 1 and may be implemented similarly as the vehicle 102 of FIG. 1. The vehicle 200 may be a fully or partially autonomous vehicle and includes a sensor system 202, a map module 204, and a vehicle control module 205, which may include a path prediction module 206, a collision warning module 207, an actuator module 208, a parameter adjustment module 209, and a step attention module 210. The sensor system 202 provides information about the vehicle 200 such as speed and yaw rate.

The path prediction module 206 may predict paths of the vehicle 200, the VRU device 104 of FIG. 1, a pedestrian carrying the VRU device 104, and/or other animate and inanimate objects and is configured to determine trajectories that the vehicle 200 is to follow. Path prediction performed by the path prediction module 206 may not ensure whether a trajectory is collision free. The path prediction is used by other collision avoidance modules to predict likelihood of a collision. The collision warning module 207 may implement the collision warning applications 252, 256 of FIG. 2. When the vehicle 200 is an autonomous or partially autonomous vehicle, the actuator module 208 may be configured to control operation of the vehicle or a portion thereof to follow planned trajectories of the vehicle 200. When the vehicle 200 is a non-autonomous vehicle (or vehicle fully controlled by driver), the actuator module 208 or other module may provide indicators to the driver to follow planned trajectories. The planned trajectories may be determined by one or more of the modules 205-207.

Figure 3:
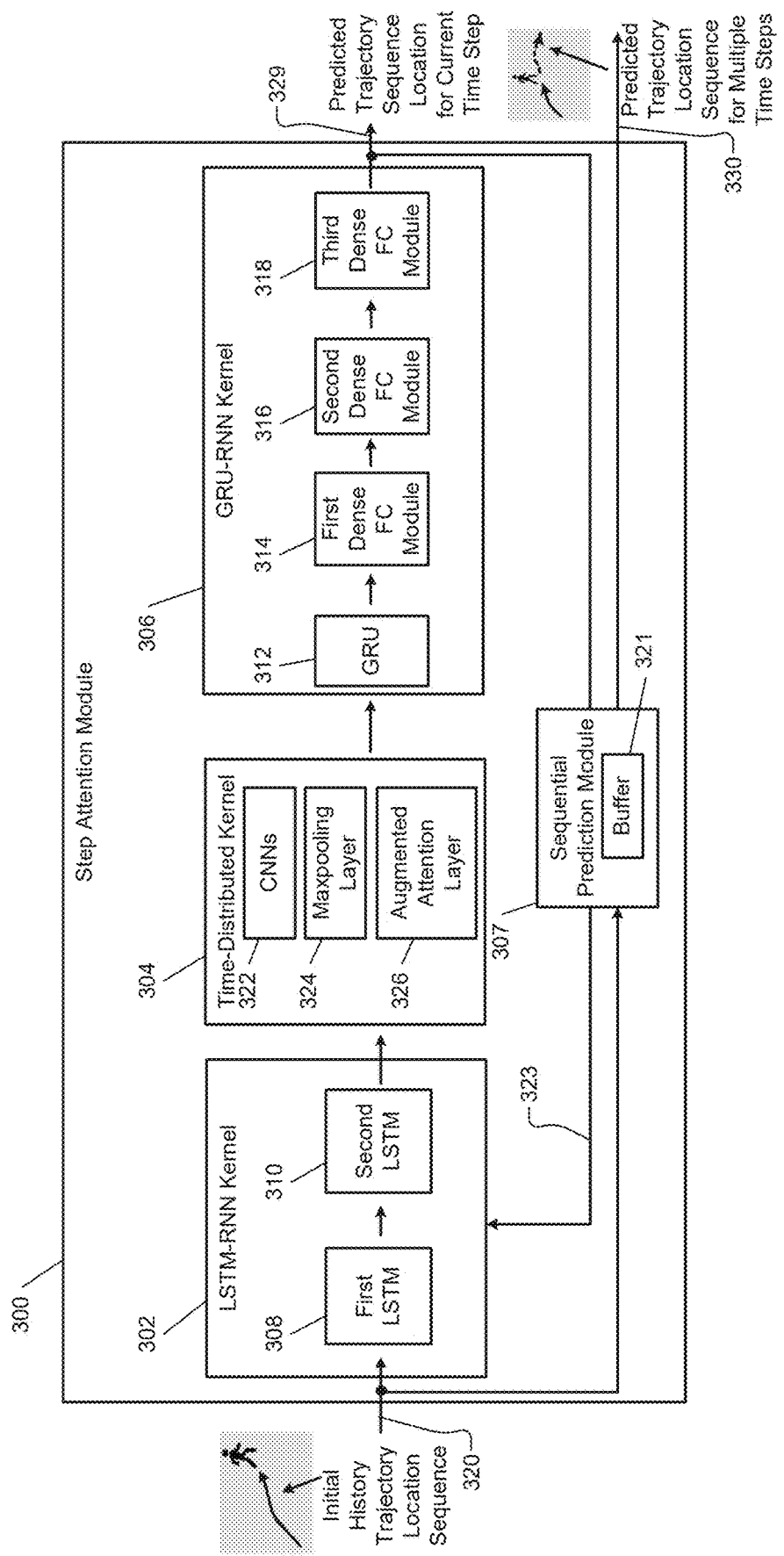
FIG. 3 is a functional block diagram of a step attention module in accordance with the present disclosure.

The step attention module 210 is configured to execute the step attention application 257 to predict trajectories of pedestrians using a step attention model as described herein. As example of the step attention module 210 is shown in FIG. 3 and operation of the step attention module 210 is described with respect to FIGS. 3-7. The collision warning module 207 may perform collision warning operations based on the predicted trajectories of the pedestrians as compared to the predicted trajectory of the vehicle 200.

The sensor system 202 provides dynamic information such as speed and yaw rate for the host vehicle). This information is provided to the modules 205-207. A map generated by, obtained by, and/or monitored by the map module 204 contains the geometric shape and characteristics of a surrounding area in a format to allow the modules 205-208 to determine where are available (permitted and feasible) driving areas and lanes.

The actuator module 208 may take the plan generated by the modules 205-207 and convert the plan to wheel, brake, and accelerator commands to affect the speed, acceleration, and heading of the ego vehicle 200. The map and object (or obstacle) information may be used to determine a best trajectory for the ego vehicle 200 to meet a goal condition (e.g., leave an ingress lane to enter a freeway or an intersection, enter a particular egress lane from a freeway or an intersection, follow a particular path to a target location and/or destination, etc.).

The vehicle 200 further includes an infotainment module 212 and other control modules 214 (e.g., a body control module). The modules 205-209, 212 and/or 214 may communicate with each other via vehicle interface 216, such as a controller area network (CAN) bus, a local interconnect network (LIN), a clock extension peripheral interface (CXPI) bus and/or other vehicle interfaces. In an embodiment, sensor signals are received from the sensor system 202 via a CAN bus at the vehicle control module 205.

The vehicle control module 205 may control operation of vehicles systems and may include the modules 205, 206, 208, 209, as well as other modules. The vehicle control module 205 may also include one or more processors that are configured to execute instructions stored in a non-transitory computer-readable medium, such as the memory 222, which may include read-only memory (ROM) and/or random access memory (RAM).

The vehicle 200 may further include: a display 230; an audio system 231; and one or more transceivers 232 including antenna modules 234. The RF antenna modules 234 may include and/or be connected to RF circuits 236. The map module 204 may communicate with a telematics module 238, a global positioning system (GPS) receiver 240 and sensors 242. The one or more transceivers 232 may include the telematics module 238. The vehicle control module 205 and/or the telematics module 238 is configured to receive GPS data and correlate GPS position data of the vehicle 200 to geographical map locations.

The RF circuits 236 may be used to communicate with mobile devices, central offices, other vehicles, land-based stations, cloud-based networks, etc. including transmission of Bluetooth®, wireless fidelity (Wi-Fi) or Wi-Fi direct and/or other RF signals satisfying various wireless communication protocols. The RF circuits 236 may include radios, transmitters, receivers, etc. for transmitting and receiving RF signals. The telematics module 238 may be implemented by a global navigation satellite system (e.g., GPS), inertial navigation system, global system for mobile communication (GSM) system, and/or other location system. The telematics module 238 may provide map information including road and object information, such as: locations, speed, acceleration, heading of vehicles; locations of objects; distances between objections; distances between a current location an intermediary and/or target destinations; etc. This information may be provided to the map module 204.

The sensors 242 may include sensors used for path prediction and planning and actuator operations. The sensors may include a vehicle speed sensor 243, a yaw rate sensor 244, and other sensors 245, such as cameras, objection detection sensors, temperature sensors, accelerometers, etc. The GPS receiver 240 may provide vehicle velocity and/or direction (or heading) of the vehicle 200 and/or global clock timing information.

The memory 222 may store various sensor data, parameter data, dimension states, trajectory planning information and other information. As an example, the memory 222 may store sensor and parameter data 250, a PCW application 252, a BSM application 254, a FCW application, 256, a path prediction application 258, timing information 260, connection information 262, and other applications 264. The connection information 262 may refer to information for connecting to other vehicles, mobile access devices, cloud-based servers, backend servers, remote stations, etc. The timing information 260 may refer to times the vehicle 200 is at certain locations, time to predicted destination (or nodal) points, etc. Transitions may be time based, based on traveled distance, and/or other conditions.

The applications 252, 254, 256, 258, 264 may be implemented by the modules 205-209, 212, 214 and 238 and/or transceivers 232. The other applications 264 may include, for example, a planning application and an actuator application. The planning application may be executed by a planning module and/or the vehicle control module 205 to plan a trajectory of the vehicle 200. The actuator application may be executed by the actuator module 208 to implement a trajectory plan selected by the planning module. The planning module may determine a target path for the vehicle 200 to follow and be implemented by the vehicle control module 205. The target path may be adjusted based on a changing environment. For example, the vehicle 200 may approach or encounter one or more objects, such as fixed objects, pedestrians, and/or other vehicles and update the target path. If the vehicle 200 is an autonomous vehicle, the vehicle 200 may follow the updated target path to avoid a collision. The parameter adjustment module 209 may be used to adjust parameters of the vehicle 200.

Although the memory 222 and the vehicle control module 205 are shown as separate devices, the memory 222 and the vehicle control module 205 may be implemented as a single device.

The vehicle control module 205 may control operation of an engine or motor 270, a converter/generator 272, a transmission 274, a window/door system 280, a lighting system 282, a seating system 284, a mirror system 286, a brake system 288, electric motors 290 and/or a steering system 292 according to parameters set by the modules 205-209, 234 and/or 238.

The vehicle control module 205 may receive power from a power source 294 that may be provided to the engine or motor 270, the converter/generator 272, the transmission 274, the window/door system 280, the lighting system 282, the seating system 284, the mirror system 286, the brake system 288, the electric motors 290 and/or the steering system 292, etc. Some of the operations as a result of planning may include enabling fuel and spark of the engine or motor 270, starting the electric motors 290, powering any of the systems referred to herein, and/or performing other operations as are further described herein. In one embodiment, the vehicle 200 does not include an engine and/or a transmission and the electric motors 290 are used for vehicle propulsion and/or driving purposes.

The engine or motor 270, the converter/generator 272, the transmission 274, the window/door system 280, the lighting system 282, the seating system 284, the mirror system 286, the brake system 288, the electric motors 290 and/or the steering system 292 may include actuators controlled by the vehicle control module 205 to, for example, adjust fuel, spark, air flow, steering wheel angle, throttle position, pedal position, door locks, window position, seat angles, etc. This control may be based on the outputs of the sensors 242, the map module 204, the GPS receiver 240 and the above-stated data and information stored in the memory 222.

Although FIGS. 3-6 are primarily described with respect to storing, detecting, determining, and predicting locations of pedestrians, and the following corresponding description refers to trajectory location sequences, the embodiments of FIGS. 3-6 may be modified to include storing, detecting, determining, and predicting velocities and/or other states of pedestrians. This may include storing and modifying trajectory sequences for each of the types of states.

Figure 4:
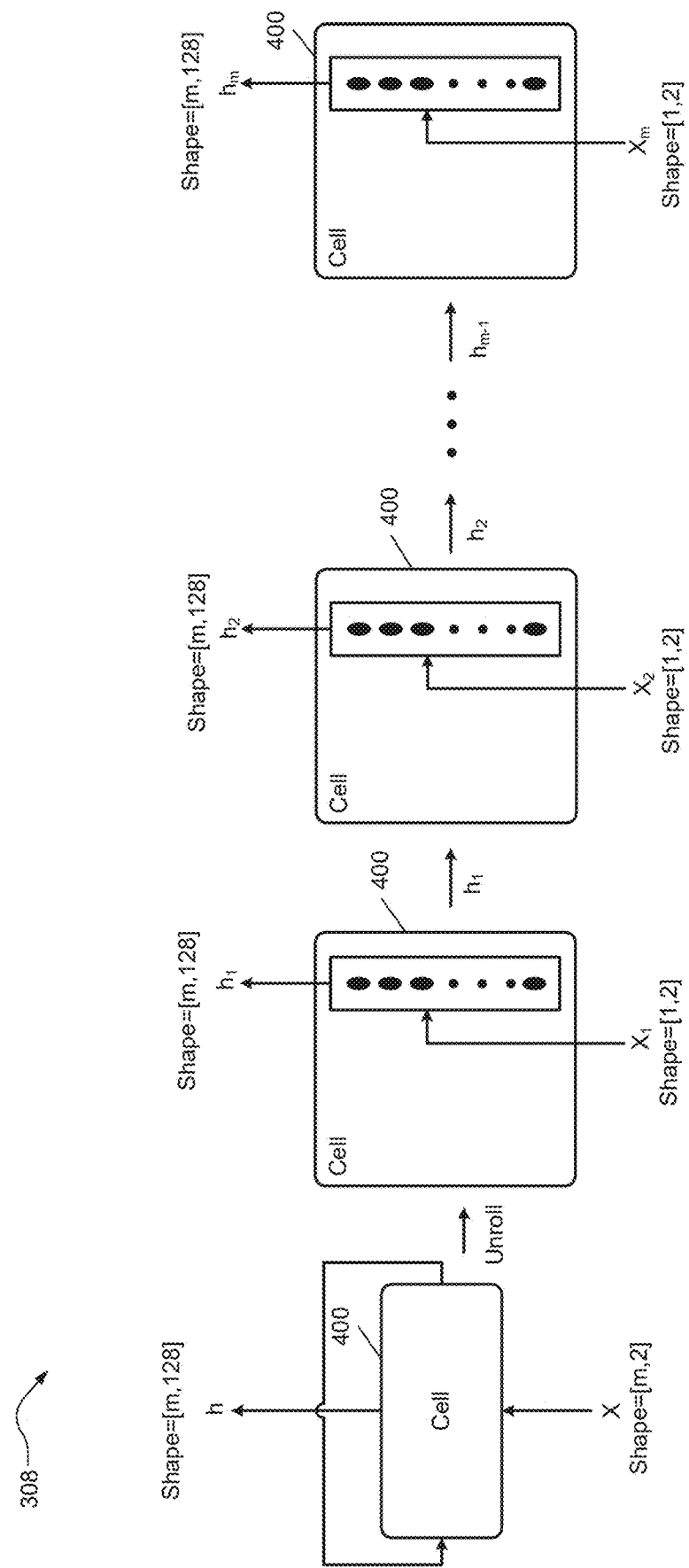
FIG. 4 is a functional block diagram of a long-short term memory (LSTM)—recurrent neural network (RNN) layer of the step attention module of FIG. 3.
Figure 5:
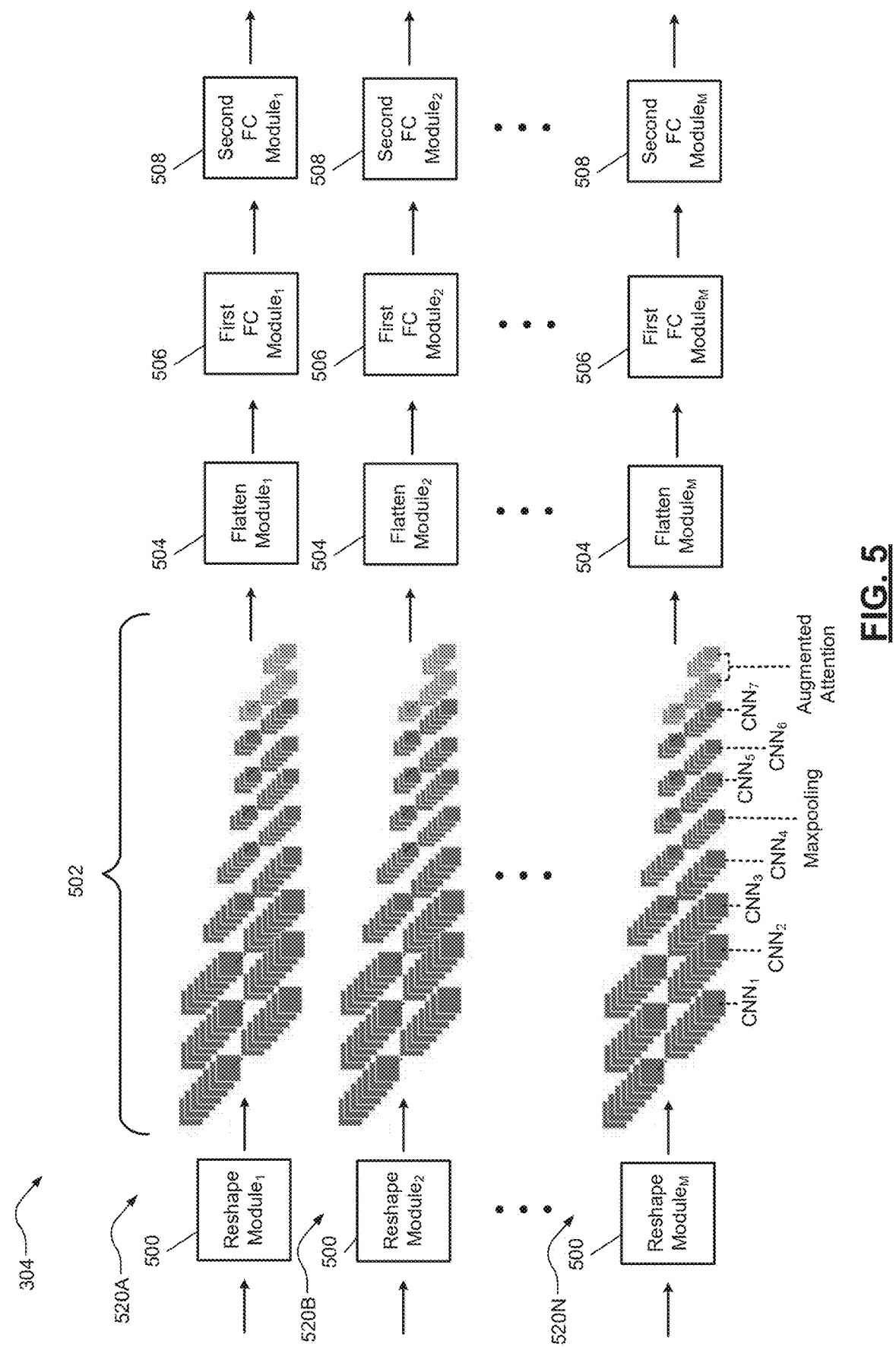
FIG. 5 is a functional block diagram of a time-distributed kernel of the step attention module of FIG. 3.

FIG. 3 shows a step attention module 300 that includes a LSTM-RNN kernel 302, a time-distributed kernel 304, a GRU-RNN kernel 306, and a sequential prediction module 307. The LSTM-RNN kernel 302 includes a first LSTM 308 and a second LSTM 310. An example architecture of a layer of the LSTM-RNN kernel 302 is shown in FIG. 4. An example of the time-distributed kernel 304 is shown in FIG. 5. The GRU-RNN kernel 306 includes a GRU 312, a first dense fully connected (FC) module 314, a second dense FC module 316, and a third dense FC module 318.

The first LSTM 308 receives an initial history trajectory location sequence 320, represented as $(X_{t-m+1}, X_{t-m+2}, \ldots, X_t)$, where $X_t=(x_t, y_t)$ are the location coordinates (Cartesian coordinates) of a pedestrian at time t for the most recent m time steps, where m is the maximum trace-back history. In another embodiment, a trajectory velocity sequence is additionally or alternatively provided and the following operations are performed may additionally or alternatively be performed with respect to velocity. The third dense FC module 318 outputs a predicted trajectory sequence location for a current time step 329, where each predicted location for a series of time steps is represented by $(X_{t+1}, X_{t+2}, \ldots, X_{t+n})$, where n is the prediction time horizon having multiple time steps. The predicted trajectory location sequence for multiple time steps 330 includes $X_{t+1}, X_{t+2}, \ldots, X_{t+n}$. Both m and n are measured as the number of time steps. The step attention module 300 solves the prediction problem of predicting pedestrian trajectories in a generic environment. The step attention module 300 predicts the position of a pedestrian within the next n time steps $(X_{t+1}, X_{t+2}, \ldots, X_{t+n})$, given a history trajectory location sequence $(X_{t-m+1}, X_{t-m+2}, \ldots, X_t)$.

The step attention module 300 learns patterns in trajectory sequences over time to provide accurate predictions of future pedestrian movements. The step attention module 300 captures sequence patterns for a series of time steps, where each time step refers to a unit of time (e.g., one millisecond or one second). The step attention module 300 has a unique architecture that is designed based on advantages and drawbacks of different types of neural networks, as well as computation cost. RNNs are known for their ability in learning time-related patterns. Since the raw input of the step attention module 300 is a pedestrian history trajectory (referred to as a history trajectory location sequence), the LSTM-RNN kernel 302 is included to learn time-related patterns. Within the LSTM-RNN kernel 302, based on demonstrated advantages of LSTMs in learning sequential sensor data, two LSTMs 308, 310 are used to learn time-related patterns within the raw input and/or data received from the sequential prediction module 307.

Although time-related patterns are learned, high-dimensional patterns within each time step may be missed due to the drawbacks of a RNN. To overcome this problem, a second kernel (i.e., the time-distributed kernel 304) is used and designed to learn patterns for each time step. The time-distributed kernel 304 includes deep learning convolutional neural networks (CNNs). The deep learning CNNs are adopted to learn hidden feature patterns within a time step. However, due to the nature of the convolution operation, CNNs learn only local information of their inputs and represent learned patterns in 2-D convolutions based on convolution kernels. These 2-D convolutions are isolated between each other and their original spatial information in inputs are missing. The time-distributed kernel 304 then uses augmented attention to mitigate this drawback by introducing relative spatial logits to represent relative position information of inputs and uses such information along with learnable weights to learn global patterns of inputs. A loss function may be used to learn the weights. The weights are used to add connections between features of learned global patterns.

The time-distributed kernel 304 outputs a new sequence, which represents previously learned patterns in time order. Hence, another RNN (i.e., the GRU-RNN kernel 306) is used and designed to further learn the sequence-related features in the series. Unlike the first RNN kernel 302, the second RNN kernel 306 uses the GRU 312 due to its computation efficiency. Note that the proposed step attention model predicts the position of a pedestrian for a next time step based on the history trajectory information. The step attention model uses this prediction to predict future time step positions sequentially, thereby producing a sequential trajectory prediction. This is further explained below.

In the following description, various shapes are disclosed. The shapes are provided as examples, other shapes may be provided.

LSTM-RNN Kernel

As shown in FIG. 3, the LSTM-RNN kernel 302 is implemented at the beginning of the architecture and receives an input sequence having shape [m, 2], where m is the length of the history trajectory location sequence 320 (or an updated trajectory location sequence 323 received from the sequential prediction module 307) and 2 is the dimension of the location coordinates. The history trajectory length m depends on frequency, where 2 m is the number of data points. First, the history trajectory is encoded and learned by the first LSTM 308 (referred to as the first LSTM layer) having an output with shape [m, 128], and then it is passed to a second LSTM (or second LSTM layer) 310 having an output with shape [m, 256]. The two LSTM layers 308, 310 extract time-related patterns directly from the input trajectory location sequence 320 or the updated trajectory location sequence 323. The LSTM-RNN kernel 302 processes the raw data of the history trajectory location sequence 320 or the updated trajectory location sequence 323 to provide a new high-dimensional time-ordered sequence. The high-dimensional time-ordered sequence includes time-dependent hidden features (or states) of high-dimensional patterns of coordinates with long and short term dependencies. The output of the second LSTM 310 is m time steps of resultant hidden features.

RNNs demonstrate great performance in capturing series-related hidden features from sequences. A LSTM is able to store and discard (or forget) input information via forget, input, and output gates of the LSTM. An LSTM-based RNN layer is a looped structure in which the output of a time step is connected to a next time step, as illustrated in FIG. 4, where m is the number of time steps. FIG. 4 shows a LSTM-RNN layer (or the first LSTM 308). Note that to make the LSTM process of m×2 shape into an output shape of m×128, 128 units in the hidden layer of the LSTM cell (one of cells 400) are set. Each LSTM cell (e.g., cells 400 of FIG. 4) takes in a 1×2 shape vector X (example vectors $X_{1-m}$ are shown) and a previous hidden vector $h_{prev}$ and outputs a current 1×128 shape vector $h_{cur}$ (example vectors $h_{1-m}$ are shown) according to the hidden layer. An LSTM layer is formed by duplicating m LSTM cells, and therefore the output shape of m×128 with 128 hidden features $h_m$ is obtained after the LSTM layer. The second LSTM 310 may have an output with a [m,256] shape.

Time-Distributed Kernel

FIG. 5 shows the time-distributed kernel 304 of the step attention module of FIG. 3. The time-distributed kernel 304 includes reshape modules 500, convolutional neural networks CNNs providing convolutional outputs, represented by boxes 502, flatten modules 504, first fully connected (FC) modules 506, and second FC modules 508. The second LSTM 310 of FIG. 3 has multiple outputs for respective time steps that are received at the CNNs. The time-distributed kernel 304 captures patterns from output sequences of the LSTM-RNN kernel 302. Given a time-ordered sequence, the time-distributed kernel 304 assigns a pipeline to each input in the sequence. Pipelines 520A-520N are shown and learn respective patterns respectively for the m time steps. Pipelines from different time steps do not share weights with each other. Each of the pipelines 520A-520N includes: a respective one of the reshape modules 500; a respective set of CNNs; a respective one of the flatten modules 504; a respective one of the first fully connected (FC) modules 506; and a respective one of the second FC modules 508. As a result, the time-distributed kernel 304 generates an ordered sequence as its output. In other words, each pipeline learns high-dimensional patterns from a single time step for which it is trained.

The time-distributed kernel 304 has multiple CNN layers 322 (CNN layers for the Nth pipeline are designated $CNN_{1-7}$), a maxpooling layer 324 and an augmented attention layer 326. Each of the layers 322, 324, 326 have outputs represented by a series of boxes (or a set portion of the boxes 502). Each set of boxes represent the convolutional outputs of the stated layers. The size of the boxes decreases from the first layer to the last layer representing the associated data being condensed.

In the beginning, the raw input trajectory sequence encoded by the LSTM-RNN kernel 302 may be reshaped to [m, 16, 16], i.e., into a sequence of m 2-D tensors with dimension [16, 16]. The purpose of the reshaping operation is to prepare the encoded sequence for the following CNN kernel, as the CNN within each pipeline is constructed to take a 2-dimensional tensor as input. As shown in FIG. 3, each pipeline begins with four CNN layers (some of which designated $CNN_{1-4}$) respectively with shapes [13, 13, 1024], [12, 12, 512], [9, 9, 256] and [8, 8, 128], respectively. The maxpooling layer 324 then performs pooling to down sample the data. Next, three more CNN layers (some of which designated $CNN_{4-7}$) respectively with shapes [3, 3, 64], [2, 2, 32] and [1, 1, 16] are designed to further learn high-dimensional patterns.

Augmented Attention

The augmented attention layer 326 is then implemented to squeeze and learn the patterns processed by the previous layers, and generate an output of shape [1, 1, 4]. The augmented attention layer 326 is followed by a flatten layer (or module) 504 and multiple FC layers (or modules) 506, 508. The flatten layer is a type of FC layer. The three FC layers have output shapes [4], [128] and [32] and learn from the patterns generated by the augmented attention layer. The final output of the time-distributed kernel 304 has the shape [m, 32], as each trajectory contains m time steps.

Through the time-distributed kernel 304, the proposed architecture learns patterns in a high-dimensional space within each time step. That is, rather than learning a global sequence pattern from the input trajectory, which is the task of the RNN kernels 302, 306 in the model, the time-distributed kernel 304 focuses on learning patterns in each time step. As convolution sequences are generated by the CNNs 322 (also referred to as CNN layers) in the time-distributed kernel 304 for each time step, the augmented attention layer 326 learns the global patterns in the convolution sequences generated in a time step, which mitigates the drawback of CNNs, i.e., learning only local information.

The outputs of CNNs in the proposed architecture are sequences of 2 dimensional (2-D) convolutions. For each time step in the time-distributed kernel 304, after several CNN layers, long convolution sequences are obtained that represent local information of their leading layers. Augmented attention is introduced to allow the model to capture global information of the convolutions from the previous layer.

A self-attention mechanism may be used for one-dimensional (1-D) inputs and use query Q, key K and value V logits to compute multi-head attention (MHA) results. Given a flattened 1-D input matrix X of an original matrix, the resulting value $O_h$ of a single head h may be calculated using equation 1, where Wq, Wk and Wv are learned weights of query, key and value, respectively, and dk is the depth of keys per attention head.

$$O_h = Softmax\left(\frac{(XW_q)(XW_k)^T}{\sqrt{d_k^h}}\right)(XW_v) = Softmax\left(\frac{QK^T}{\sqrt{d_k^h}}\right)V \quad (1)$$

In equation 1, spatial information related to input width and height is lost as the original input is flattened into a 1-D vector. This may harm performance in learning global patterns. As a single convolution output is always 2-D, the augmented attention layer receives 2-D convolutions as inputs, and learns global and spatial information within convolutions. In augmented attention, relative spatial information in a convolution is preserved by introducing additional logits to compute $O_h$, as represented by equation 2.

$$O_h = Softmax\left(\frac{QK^T + S_H^{rel} + S_W^{rel}}{\sqrt{d_k^h}}\right)V \quad (2)$$

In equation 2, $S_H^{rel}$ and $S_W^{rel}$ are logits representing relative position information from the input and may be calculated using equations 3 and 4, where $r_{j_y-i_y}^H$ and $r_{j_x-i_x}^W$ are learned representations for relative height, jy−iy, and width, jx−ix, respectively.

$$S_H^{rel}[i,j] = q_i^T r_{j_y-i_y}^H \quad (3)$$

$$S_W^{rel}[i,j] = q_i^T r_{j_x-i_x}^W \quad (4)$$

Here, $q_i$ is the query vector at position i=($i_x$, $i_y$). The output Oh of (2) is a single head. While the input is 2-D, we obtain a multi-head attention (MHA) 2-D output. The augmented attention mechanism is then constructed by concatenating the attention with the previous convolution layer.

GRU-RNN Kernel

The output of the time-distributed kernel 304 of FIG. 3 is a set of trajectory patterns that are represented by a new sequence of high-dimensional tensors. The GRU-RNN kernel 306 includes a GRU-RNN network that is used to further learn time-related patterns in the new sequence and decode the new sequence into future predicted pedestrian locations. Similar to a LSTM, the GRU 312 uses a gate design. However, the gates of the GRU 312 are limited only to reset and update gates. This makes a GRU-based model more computationally efficient. The GRU-RNN kernel 306 learns the time-related patterns of the new sequence. Unlike the LSTM-RNN kernel 302, the GRU-RNN kernel 306 does not return a time series sequence. Instead, the GRU-RNN kernel 306 removes temporal dimensions (hidden state outputs from time step 1 to t−1) of the GRU states, and outputs the state of the most recent GRU unit, which produces a one-dimensional output. The GRU 312 takes result of previous layers and then squeezes the output of the previous layers to provide an output having a shape [256]. The GRU 312 is followed by three dense FC layers (or modules) 314, 316, 318 with shapes [128], [64] and [2]. The model generates results with shape [1, 2] as a prediction for the next time step.

Sequential Prediction

Figure 6:
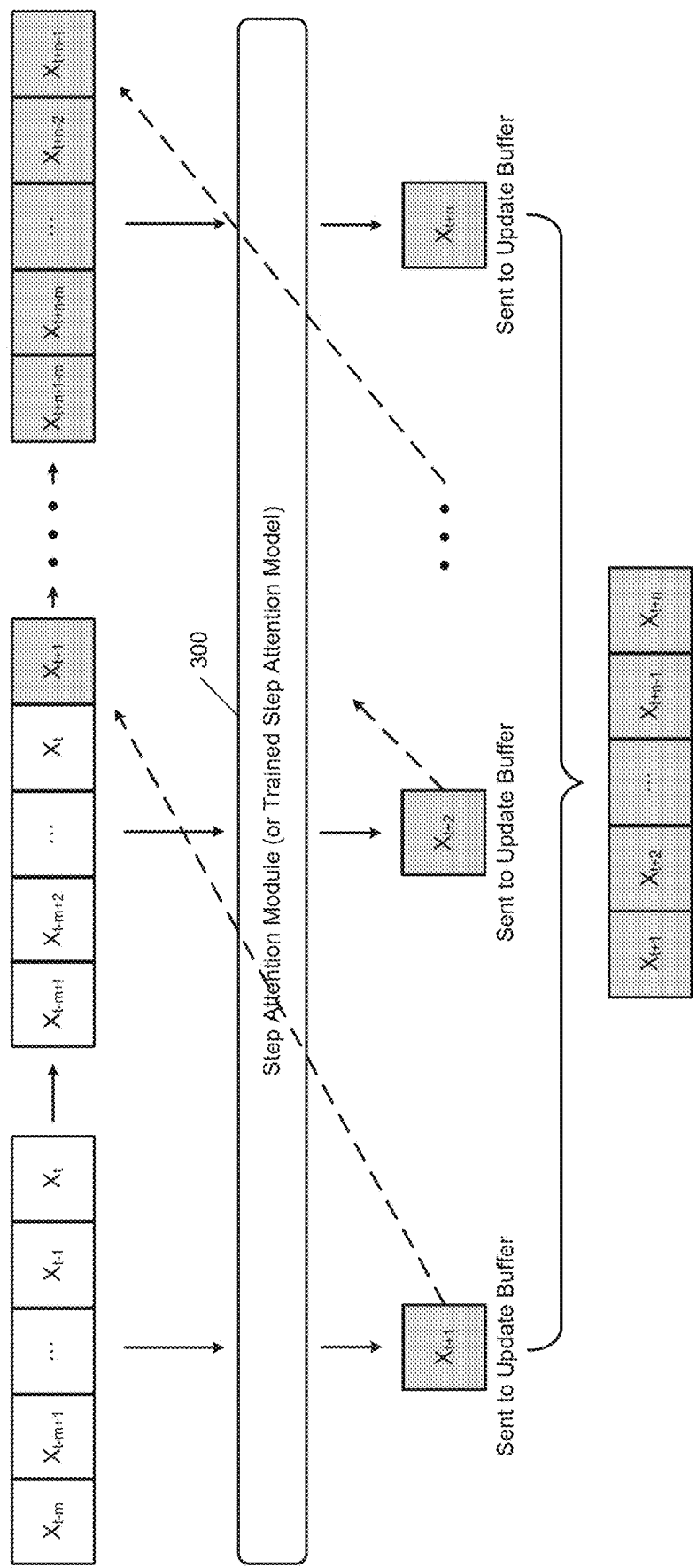
FIG. 6 is a block representation of a sequential strategy for trajectory prediction in accordance with the present disclosure.

FIG. 3 shows a sequential prediction module 307, which may be used to implement a sequential strategy for trajectory prediction, as shown in FIG. 6. The sequential prediction module 307 may receive the initial history trajectory location sequence and incrementally, through iterations of the step attention process, discard the oldest locations and append newly predicted locations to provide the predicted resultant trajectory 330. Each iteration of the step attention process implemented by the step attention module 300 may include discarding an oldest location and appending a newly predicted location provide by the GRU-RNN kernel 306. This iterative process is referred to as sequential prediction and essentially has a moving time window in which each subsequent location is predicted for a subsequent time step based on a lasted updated set of locations. The latest updated set of locations may include one or more previously detected locations and one or more predicted locations; the number of predicted locations equals the number of iterations of the step attention process. This process is different than a one-shot process of trajectory prediction, where a future trajectory of multiple predicted locations is predicted through a single iteration of a process.

The sequential prediction process disclosed herein includes predicting future locations of a pedestrian in a sequential manner. The step attention module 300 outputs n predictions through n executions of the iterative process, where each execution of the process predicts a future location in a single time step. Given a history trajectory location sequence (Xt−m+1, Xt−m+2, . . . , Xt) in a first execution of the process, the step attention module 300 predicts a position of time step Xt+1. The history trajectory location sequence (Xt−m+1, Xt−m+2, . . . , Xt) is shown in FIG. 6 as the initial input to the step attention module 300. The step attention module 300 implements the step attention model, which is trained by performing iterations of the step attention process. The sequential prediction module 307 may store the history trajectory location sequence in a buffer 321.

Next, the step attention module 300 and/or sequential prediction module 307 removes the oldest point (i.e., Xt−m+1) from the history trajectory location sequence stored in the buffer 321, and pushes the predicted position into the buffer 321, producing the new input sequence (Xt−m+2, . . . , Xt, Xt+1), as shown in FIG. 6. This is followed by another n−1 iterations of the process, where during each iteration, the oldest point is removed from buffer 321 and the most recent prediction is added to the buffer 321. The final result is a predicted trajectory (Xt+1, Xt+2, . . . , Xt+n) with length n. The sequential prediction strategy is shown in FIG. 3. Note, that the model needs to be trained only once. Once the model is trained, by updating the trajectory buffer, a trajectory sequence with any desired length n can be predicted by invoking the trained model sequentially n times. Unlike models that use a fixed-length sequence prediction strategy, the disclosed sequential prediction strategy allows the length of the prediction horizon to be customizable, set and adjusted. This length may be set based on a user input.

Figure 7:
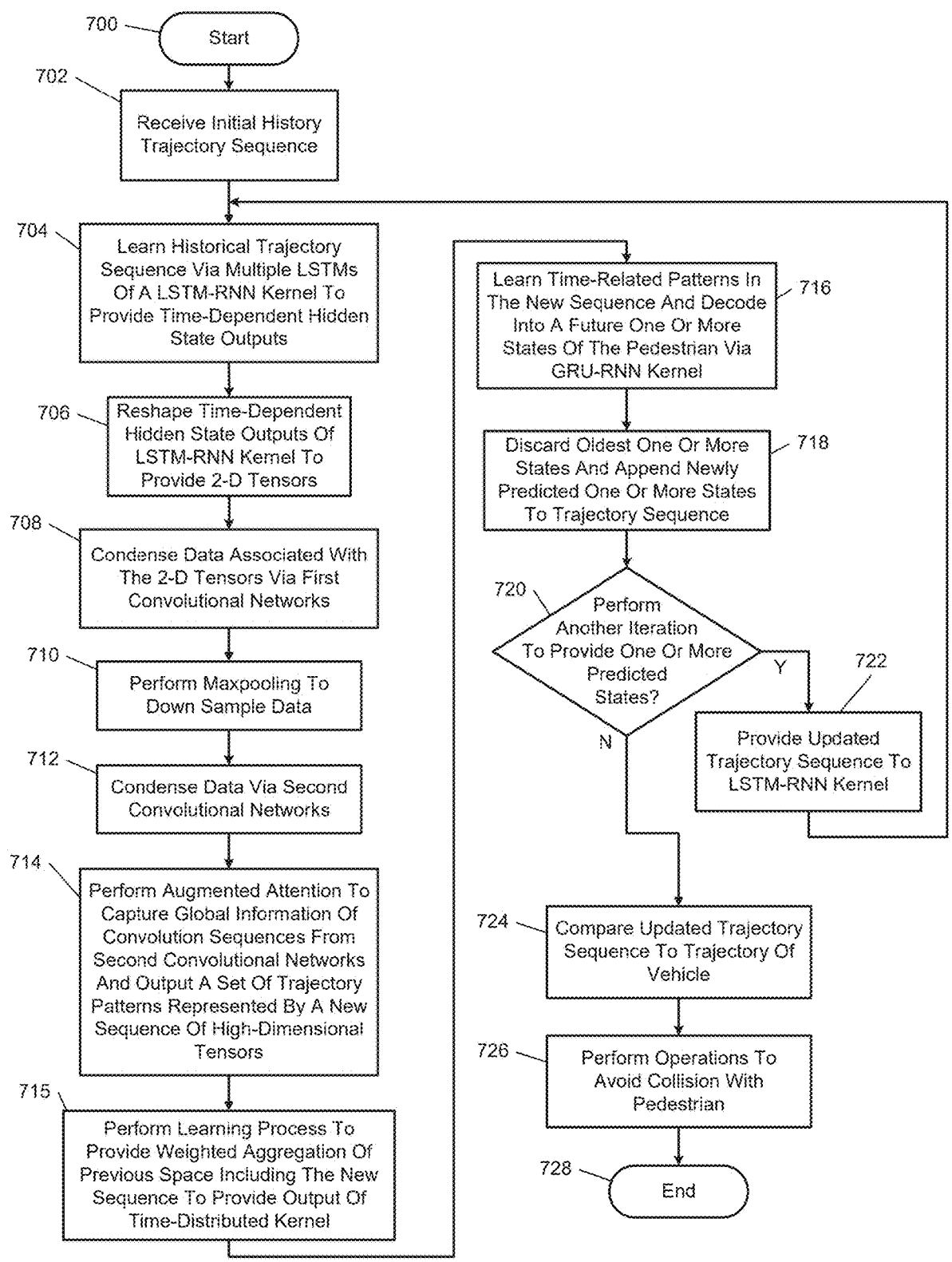
FIG. 7 illustrates a pedestrian collision avoidance method including step attention model in accordance with the present disclosure.

FIG. 7 shows a pedestrian collision avoidance method including step attention model. The following operations may be implemented by the step attention module 300 of FIG. 3 and the vehicle control module 205 of FIG. 2. Although the following method is primarily described with respect to locations and velocities of a pedestrian and refers to trajectory location sequences and trajectory velocity sequences, the operations may be modified to monitor, detect, determine, predict and/or store pedestrian states other than locations and velocities, such as speeds, headings, etc. A trajectory sequence may be a single dimensional trajectory sequence or a multi-dimensional trajectory sequence. As an example, a single dimensional trajectory sequence may be a trajectory location sequence including a sequence of locations of the pedestrian over time. As another example, a single dimensional trajectory sequence may be a trajectory velocity sequence including a sequence of velocities (headings and speeds) of the pedestrian over time. A multi-dimensional trajectory sequence may be include i) a sequence of locations of the pedestrian, ii) a sequence of velocities of the pedestrian, and/or iii) one or more other sequences of other states (e.g., headings or speeds). Each trajectory sequence may include at least one of i) previous actual states of the pedestrian, and ii) predicted states of the pedestrian.

The method may begin at 700. At 702, the first LSTM 308 of the LSTM-RNN kernel 302 receives the initial historical trajectory sequence (e.g., location or velocity trajectory sequence). This may be a sequence stored in memory that was previously generated based on the tracking of the locations of a pedestrian.

The following operations may be iteratively performed; each iteration providing a next predicted location of the pedestrian.

At 704, the LSTMs 308, 310 learn the historical trajectory sequence to provide time-dependent hidden state outputs. At 706, the reshape modules 500 reshape the time-dependent hidden state outputs of the LSTM-RNN kernel 302 to provide 2-D tensors.

At 708, first CNNs (e.g., $CNNS_{1-4}$) condense data associated with the 2-D tensors. At 710, the maxpooling layer 324 performs maxpooling to down sample the condensed data. This may include determining and selecting maximum points in maximum ranges to provide down sampled data. Maxpooling includes removing some information. At 712, second CNNs (e.g., $CNNs_{5-7}$) further condense the down sampled data.

At 714, the augmented attention layer 326 performed augmented attention to capture global information of convolution sequences from second CNNs and outputs a set of trajectory patterns represented by a new sequence of high-dimensional tensors. The augmented attention layer 326 adds connections between resultant convolutional data via weights based on rules to learn the global information.

At 715, the FC modules 504, 506, 508 perform a learning process to provide a weighted aggregation of the previous space including the new sequence of high-dimensional tensors to provide the final output of the time-distributed kernel 304.

At 716, the GRU-RNN kernel 306 learns time-related patterns in the new sequence based on the final output of the time-distributed kernel 304 and decodes the new sequence into a future one or more states (e.g., one or more sequential states) of the pedestrian.

At 718, the sequential prediction module 307 discards the oldest one or more states of the trajectory sequence and appends the newly predicted one or more states to the trajectory sequence, as illustrated in FIG. 6. The modifying of the stored trajectory sequence includes appending the one or more predicted states and removing a different one or more states previously included in the stored trajectory sequence.

At 720, the step attention module 300 determined whether another iteration of the step attention process is to be performed to predict another one or more future states of the pedestrian. If yes, operation 722 may be performed, otherwise operation 724 may be performed.

At 722, the sequential prediction module 307 provides the updated trajectory sequence as an input to the LSTM-RNN kernel 302. At 724, the vehicle control module 205 may compare the updated trajectory sequence to a predicted trajectory of the vehicle 200. At 726, the vehicle control module 205 may perform countermeasure operations based on the comparison, such as performing autonomous driving operations and/or generating alert messages, to avoid a collision with the pedestrian. The method may end at 728 subsequent to performing operation 726.

Although various different features and embodiments are described above with respect to FIGS. 1-7, any or all of the embodiments of FIGS. 1-7 may be combined and implemented as a single embodiment.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A pedestrian tracking system comprising:
    a buffer or a memory configured to store a trajectory sequence of a pedestrian;
    a step attention module configured to iteratively perform a step attention process to predict a plurality of states of the pedestrian and iteratively modify the stored trajectory sequence to provide a resultant trajectory sequence including the predicted plurality of states, each iteration of the step attention process comprising the step attention module
        learning the stored trajectory sequence to provide a plurality of time-dependent hidden states,
        reshaping each of the plurality of time-dependent hidden states to provide two-dimensional tensors,
        condensing the two-dimensional tensors via a plurality of convolutional networks to provide convolutional sequences for each of a plurality of time steps,
        learning hidden feature patterns within each of the plurality of time steps via the plurality of convolutional networks based on the convolution sequences,
        introducing relative spatial logits to represent relative position information of inputs of the plurality of convolution networks,
        based on the hidden feature patterns and the relative position information of the inputs, learn global patterns of the inputs for each of the plurality of time steps,
        capturing global information of the convolutional sequences including the global patterns to output a set of trajectory patterns represented by a new sequence of tensors,
        learning time-related patterns in the new sequence of tensors and decoding the new sequence to provide one or more of the predicted plurality of states of the pedestrian, and
        modifying the stored trajectory sequence to include the one or more of the predicted plurality of states; and
    a control module configured to, based on the resultant trajectory sequence, perform a countermeasure operation to avoid a collision with the pedestrian.

2. The pedestrian tracking system of claim 1, wherein the stored trajectory sequence is a single dimensional sequence including i) locations of the pedestrian, ii) speeds of the pedestrian or iii) velocities of the pedestrian.

3. The pedestrian tracking system of claim 1, wherein the stored trajectory sequence is a multi-dimensional sequence including two or more of i) locations of the pedestrian, ii) speeds of the pedestrian and iii) velocities of the pedestrian.

4. The pedestrian tracking system of claim 1, wherein the modifying of the stored trajectory sequence to include the one or more of the predicted plurality of states includes removal of a different one or more states previously included in the stored trajectory sequence.

5. The pedestrian tracking system of claim 1, wherein entries of the stored trajectory sequence are at least one of i) previous actual states of the pedestrian, and ii) predicted states of the pedestrian.

6. The pedestrian tracking system of claim 5, wherein the previous actual states and the predicted states are positions, speeds or velocities of the pedestrian.

7. The pedestrian tracking system of claim 1, wherein the step attention module comprises a plurality of long-short term memories of a first recurrent neural network kernel, the plurality of long-short term memories being configured to learn the trajectory sequence to provide the plurality of time-dependent hidden states.

8. The pedestrian tracking system of claim 7, further comprising a second recurrent neural network kernel, wherein:
    the step attention module is configured to assign a plurality of pipelines respectively to a plurality of outputs of the first recurrent neural network kernel; and
    the second recurrent neural network kernel is configured to receive outputs of the plurality of pipelines and to provide the one or more of the predicted plurality of states.

9. The pedestrian tracking system of claim 8, wherein each of the plurality of pipelines comprises a reshape module, the plurality of convolutional networks, and a plurality of fully connected modules connected in series.

10. The pedestrian tracking system of claim 1, wherein the step attention module comprises a time distributed kernel comprising:
    reshape modules configured to reshape the plurality of time-dependent hidden states to provide the two-dimensional tensors; and
    a plurality of fully connected modules configured to capture the global information of the convolutional sequences to output the set of trajectory patterns represented by the new sequence of tensors.

11. The pedestrian tracking system of claim 1, wherein:
    the step attention module is configured to, during each iteration of the step attention process,
        condense the two-dimensional tensors of each hidden state to provide condensed data via first convolutional networks,
        perform maxpooling to down sample the condensed data to provide down sampled data via a maxpooling layer, and
        condense the down sampled data to provide the convolutional sequences via second convolutional networks; and the plurality of convolution networks comprise the first convolutional networks and the second convolutional networks.

12. The pedestrian tracking system of claim 1, wherein the step attention module is configured to perform augmented attention to capture the global information.

13. The pedestrian tracking system of claim 1, wherein the step attention module comprises a gated recurrent unit recurrent neural network kernel configured to learn the time-related patterns in the new sequence and decode the new sequence into the one or more of the predicted plurality of states.

14. The pedestrian tracking system of claim 13, wherein the gated recurrent unit recurrent neural network kernel comprises a gated recurrent unit and a plurality of fully connected modules.

15. The pedestrian tracking system of claim 1, wherein the step attention module is configured to, during each iteration of the step attention process, discard an oldest location of the pedestrian stored in the buffer or the memory as part of the trajectory sequence and append the one or more of the predicted plurality of states to the trajectory sequence.

16. The pedestrian tracking system of claim 1, wherein each time step of the trajectory sequence of the pedestrian includes cartesian coordinates of the pedestrian for a current time for a most recent plurality of time steps.

17. The pedestrian tracking system of claim 1, wherein the modifying of the stored trajectory sequence comprises appending the predicted plurality of states to the stored trajectory sequence.

18. A method of operating a pedestrian tracking system, the method comprising:
storing a trajectory sequence of a pedestrian in a buffer or a memory;
iteratively performing a step attention process to predict a plurality of states of the pedestrian and iteratively modify the stored trajectory sequence to provide a resultant trajectory sequence including the predicted plurality of states, each iteration of the step attention process comprising
learning the stored trajectory sequence to provide a plurality of time-dependent hidden states,
reshaping each of the plurality of time-dependent hidden states to provide two-dimensional tensors,
condensing the two-dimensional tensors via a plurality of convolutional networks to provide convolutional sequences for each of a plurality of time steps,
learning hidden feature patterns within each of the plurality of time steps via the plurality of convolutional networks based on the convolution sequences,
introducing relative spatial logits to represent relative position information of inputs of the plurality of convolution networks,
based on the hidden feature patterns and the relative position information of the inputs, learn global patterns of the inputs for each of the plurality of time steps,
capturing global information of the convolutional sequences including the global patterns to output a set of trajectory patterns represented by a new sequence of tensors,
learning time-related patterns in the new sequence of tensors and decoding the new sequence to provide one or more of the predicted plurality of states of the pedestrian, and
modifying the stored trajectory sequence to include the one or more of the predicted plurality of states; and
based on the resultant trajectory sequence, performing a countermeasure operation to avoid a collision with the pedestrian.

19. The method of claim 18, wherein the stored trajectory sequence is a single dimensional sequence including i) locations of the pedestrian, ii) speeds of the pedestrian or iii) velocities of the pedestrian.

20. The method of claim 18, wherein the stored trajectory sequence is a multi-dimensional sequence including two or more of i) locations of the pedestrian, ii) speeds of the pedestrian and iii) velocities of the pedestrian.

21. The method of claim 18, wherein the modifying of the stored trajectory sequence to include the one or more of the predicted plurality of states includes removal of a different one or more states previously included in the stored trajectory sequence.

22. The method of claim 18, wherein entries of the stored trajectory sequence are at least one of i) previous actual states of the pedestrian, and ii) predicted states of the pedestrian.

23. The method of claim 22, wherein the previous actual states and the predicted states are positions, speeds or velocities of the pedestrian.

24. The method of claim 18, wherein further comprising, via a plurality of long-short term memories of a first recurrent neural network kernel, learning the trajectory sequence to provide the plurality of time-dependent hidden states.

25. The method of claim 24, further comprising:
assigning a plurality of pipelines respectively to a plurality of outputs of the first recurrent neural network kernel; and
receiving at a second recurrent neural network kernel outputs of the plurality of pipelines and to provide the one or more of the predicted plurality of states.

26. The method of claim 25, wherein each of the plurality of pipelines comprises a reshape module, the plurality of convolutional networks, and a plurality of fully connected modules connected in series.

27. The method of claim 18, further comprising:
reshaping the plurality of time-dependent hidden states to provide the two-dimensional tensors; and
capturing the global information of the convolutional sequences to output the set of trajectory patterns represented by the new sequence of tensors.

28. The method of claim 18, further comprising, during each iteration of the step attention process:
condensing the two-dimensional tensors of each hidden state to provide condensed data via first convolutional networks;
performing maxpooling to down sample the condensed data to provide down sampled data via a maxpooling layer; and
condensing the down sampled data to provide the convolutional sequences via second convolutional networks,
wherein the plurality of convolution networks comprise the first convolutional networks and the second convolutional networks.

29. The method of claim 18, further comprising performing augmented attention to capture the global information.

30. The method of claim 18, further comprising, via a gated recurrent unit recurrent neural network kernel, learning the time-related patterns in the new sequence and decoding the new sequence into the one or more of the predicted plurality of states.

31. The method of claim 30, wherein the gated recurrent unit recurrent neural network kernel comprises a gated recurrent unit and a plurality of fully connected modules.

32. The method of claim 18, further comprising, during each iteration of the step attention process, discarding an oldest location of the pedestrian stored in the buffer or the memory as part of the trajectory sequence and appending the one or more of the predicted plurality of states to the trajectory sequence.

* * * * *